Figure 1:
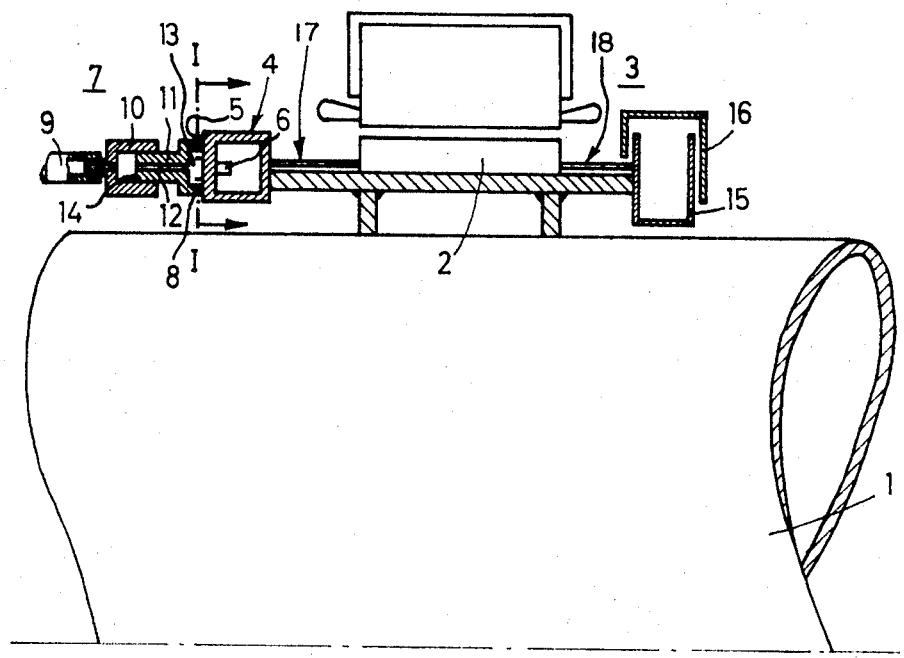

United States Patent [19]
Lang

[11] 3,748,506
[45] July 24, 1973

[54] ELECTRIC MACHINE OF LARGE DIAMETER AND LOW ROTATIONAL SPEED HAVING A LIQUID-COOLED ROTOR

[75] Inventor: Karl Lang, Berlin, Germany

[73] Assignee: Siemens Aktiengesellschaft, Berlin, Germany

[22] Filed: Dec. 20, 1971

[21] Appl. No.: 209,937

[30] Foreign Application Priority Data
Dec. 22, 1970 Germany............... P 20 64 821.9

[52] U.S. Cl.................................... 310/53, 310/59
[51] Int. Cl. ............................................. H02k 9/00
[58] Field of Search .................. 310/54, 64, 53, 63, 310/58, 59, 52; 418/91; 417/51

[56] References Cited
UNITED STATES PATENTS
3,497,736  2/1970  Cuny..................................... 310/54
2,939,399  6/1960  Rutschi................................. 310/63
3,318,253  5/1967  Campolong........................... 310/54

FOREIGN PATENTS OR APPLICATIONS
1,240,647  8/1960  France................................. 310/54

Primary Examiner—R. Skudy
Attorney—Arthur E. Wilfond, Herbert L. Lerner et al.

[57] ABSTRACT

In an electric machine of large diameter and low speed of rotation, cooling liquid is fed to the rotor via standing, open chambers. The edges of the open chambers rest against the plane end face of a rotating manifold having check valves, providing a seal.

5 Claims, 2 Drawing Figures

ELECTRIC MACHINE OF LARGE DIAMETER AND LOW ROTATIONAL SPEED HAVING A LIQUID-COOLED ROTOR

The present invention relates to an electric machine of large diameter and low speed of rotation. More particularly, the invention relates to a motor for driving a tubular mill. The rotor of the motor is arranged directly on the cylinder of the tubular mill. In order to remove the heat loss generated in the rotor, said rotor is liquid-cooled in a manner known per se. The cooling liquid, for example, water, is fed to cooling ducts in the rotor via a rotating manifold positioned at the end face of the rotor.

As is known, it is simplest to transmit the cooling liquid supplied by a stationary system to the revolving rotor via an end face of the rotor shaft. Frequently, however, no free rotor shaft end is available for this purpose, for example, in tubular mill drives, so that there is a problem in feeding the cooling liquid to a rotating manifold provided on the surface of the rotor without great expenditure.

An object of the invention is to provide an electric machine of large diameter and low speed of rotation in which cooling liquid is fed to cooling ducts of the liquid-cooled rotor via a simple structure with efficiency, effectiveness and reliability.

In accordance with the invention, the outer end face of the rotating manifold is arranged perpendicularly to the rotor axis and contains check valves uniformly distributed along the circumference. Cooling liquid supply chambers, in sealed condition, rest upright against the outer end face of the manifold. The cooling liquid supply chambers are open at their end faces. The plane end face of the manifold therefore slides past the open cooling liquid supply chambers which rest against it and are sealed, during its rotation, and the pressure of the cooling liquid prevailing in them opens the respective check valves located in the range of each chamber and the cooling liquid is transferred into the manifold. Since the transfer of the cooling liquid occurs at an end surface which is perpendicular to the axis of the rotor, this surface can, provided the seal of the cooling liquid supply chambers remains intact, shift somewhat in axial and radial directions without impairment of the liquid supply. Changes in the position of the parts of the electric machine due to temperature differences existing between the rest condition and the operating condition can therefore be compensated for without difficulty.

The distance of the individual check valves from each other, the size of their passage openings and the number and cross-section of the available upright cooling liquid supply chambers must be chosen so that the required quantity of cooling liquid is fed to the rotor reliably under all conditions.

In order to avoid an interruption of the cooling liquid supply to the rotor, it is advisable to make each coolant supply chamber so large that it covers at least two check valves. Therefore, at least one check valve is always open. In the case of several cooling liquid supply chambers, these can be mutually offset with respect to their positions relative to the check valves so that, even if one check valve leaves the region of one cooling liquid supply chamber and closes, check valves are located fully in the area of other cooling liquid supply chambers and are therefore open.

In the arrangement of the invention, it will not be possible to prevent the cooling liquid from escaping along the gap formed between the end face of the manifold and the edges of the cooling liquid supply chambers which, in particular, can be provided with a sealing material. Such a leakage loss of cooling liquid is, however, an advantage in certain applications. If, for example, the arrangement of the invention is used for cooling the rotor of a cement mixer drive motor, said drive motor operates in a very dusty and dirty atmosphere. The leaking fluid escaping at the edges of the cooling liquid supply chambers then washes off the dirt deposited at the end surfaces of the manifold before this area enters under the cooling liquid supply chambers. This dirt is thereby prevented from penetrating into the interior of the rotor.

The pressure required for tight contact of the cooling liquid supply chambers at the end face of the rotating manifold can be produced in a practical manner by the pressure of the cooling liquid itself in such a way that it does not change even in the event of certain axial shifts of the end face of the manifold. However, springs can be used instead to provide the pressure.

Figure 2:
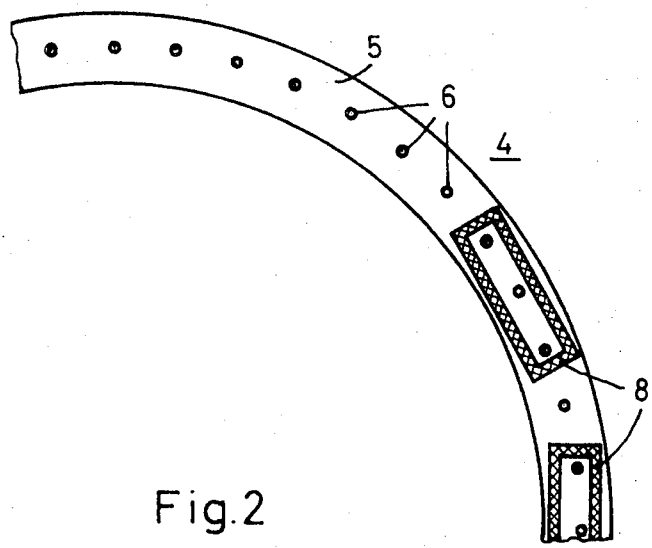

In order that the invention may be readily carried into effect, it will now be described with reference to the accompanying drawing, wherein:

FIG. 1 is a sectional longitudinal view of an embodiment of an electric machine of the invention; and FIG. 2 is a view, taken along the lines I—I, of FIG. 1.

In the FIGS., the same components are identified by the same reference numerals.

In FIG. 1, the rotor 2 of an electric synchronous motor 3 which drives the cylinder 1 of a cement mixer at a slow speed is directly mounted on said cylinder. In order to remove the heat loss occurring in the rotor 2 during operation, said rotor is liquid-cooled. For this purpose, normal, not specially prepared, water flows through cooling ducts provided in the rotor 2. The cooling ducts are not shown in detail. The water is fed to the cooling ducts via a ring-shaped or annular manifold 4 (FIG. 2) which is arranged at an end face of the rotor 2. The outer end face 5 of the manifold 4 is flat and is perpendicular to the rotor axis. The manifold 4 has check valves 6 in its outer end face 5 uniformly distributed along the circumference thereof.

The supply of the coolant from the rotating annular manifold 4 to cooling pipes (not shown) interior of the rotor 2 is free from frictional problems since no relative movement occurs between these parts. The coolant is transported through lines 17 which lead from the rotating manifold 4 to the adjacent and face of the rotor 2.

The other end face of the rotor 2 also includes pipe lines 18 disposed to enable several of such lines 18 to be distributed along the circumference and extending from the connection between the cooling pipes interior of the rotor 2 and a drainage ring 15 which is open to the outside.

A plurality of water supply chambers 7 (FIG. 1) are provided opposite the manifold 4. The water supply chambers 7 are open at the end surface facing the manifold 4 and their edges carry a sealing material 8 with which they rest against the outer end face 5, providing a seal. The dimensions of each water supply chamber 7 are chosen so large that said water supply chamber always covers several check valves 6, and at least two of said vlaves.

The pressure of the water is utilized to obtain a sufficiently large contact pressure of the edges of the water supply chamber 7 at the end face 5 of the manifold 4.

For this purpose, water supply pipes 9 open into a hollow cylinder 10. A movable piston 11 having an axial or central bore or hole 12 formed therethrough is positioned in the interior of the hollow cylinder 10. The bore 12 of the piston 11 opens into a larger water chamber 13. The pressure prevailing in the water chamber 13 is sufficient to open the check valves 6 positioned in its range.

The water flows through the check valves 6 into the interior of the manifold 4. Through the pressure prevailing on the upper end face 14 of the piston 11, said piston is pressed against the end face 5 of the manifold 4, so that only a very small gap remains between the sealing material 8 and said manifold. Only little water escapes from the small gap. In addition, springs may be arranged between the two parts of the water supply chamber 7. The springs may move with respect to each other and further increase the contact pressure at the manifold 4. It is further necessary to insure that this contact pressure is still maintained for the largest possible axial movements of the manifold 4.

After flowing through the cooling ducts of the rotor 2, the hot water is discharged at the other end face of the rotor by the drainage ring 15, which is radially open outwardly, and a collector ring 16 which surrounds said draining ring and is radially open inwardly.

While the invention has been described by means of a specific example and in a specific embodiment, it should not be limited thereto, for obvious modifications will occur to those skilled in the art without departing from the spirit and scope of the invention.

I claim:

1. In an electric machine of large diameter and low speed of rotation, said machine having a liquid-cooled rotor having cooling ducts, including: a rotating manifold mounted at one end face of said rotor for feeding cooling liquid to said cooling ducts, said manifold having an outer end face perpendicular to the axis of the rotor; a plurality of check valves aligned with respect to said outer end face of said manifold ,being uniformly distributed along the circumference thereof; and cooling liquid supply chambers positioned at said outer end face of said having open end faces resting against said outer end face to provide sealing therewith.

2. An electric machine as claimed in claim 1, wherein said cooling liquid travels under pressure and provides the pressure required for sealing contact of said cooling liquid supply chambers at said outer end face of said manifold.

3. An electric machine as claimed in claim 1, wherein each cooling liquid supply chamber covers at least two check valves.

4. An electric machine as claimed in claim 1, wherein said cooling liquid supply chambers are in offset arrangement with respect to each other in their positions relative to said check valves.

5. An electric machine as claimed in claim 1, wherein each cooling liquid supply chamber has a front edge comprising sealing material.

* * * * *